United States Patent [19]

Broadhead

[11] Patent Number: 4,551,973

[45] Date of Patent: Nov. 12, 1985

[54] HYDRAULIC POWER SOURCE AND VALVE THEREFOR

[75] Inventor: James H. Broadhead, Bay Minette, Ala.

[73] Assignee: Syntex (U.S.A.) Inc., Palo Alto, Calif.

[21] Appl. No.: 437,230

[22] Filed: Oct. 28, 1982

[51] Int. Cl.[4] .............................................. F16D 31/02

[52] U.S. Cl. .......................................... 60/477; 91/420

[58] Field of Search .................... 91/420; 60/473, 476, 60/477, 478, 475; 137/106; 417/315

[56] References Cited

U.S. PATENT DOCUMENTS

| | | | |
|---|---|---|---|
| 2,286,880 | 6/1942 | Traut | 60/460 X |
| 2,679,727 | 6/1954 | McLeod | 60/476 X |
| 2,735,443 | 2/1956 | Beck | 137/493.9 X |
| 2,847,937 | 8/1958 | Garvey et al. | 60/473 X |
| 3,370,421 | 2/1968 | Piper | 60/478 X |
| 3,473,325 | 10/1969 | Vargo | 60/476 X |
| 3,504,882 | 4/1970 | Vargo | 60/473 X |
| 3,792,710 | 2/1974 | McDermott | 137/102 |
| 3,815,361 | 6/1974 | Manini | 60/477 |
| 3,846,983 | 11/1974 | Freedy et al. | 60/478 |
| 3,975,987 | 8/1976 | Panis | 91/420 |
| 4,081,053 | 3/1978 | Sherman | 91/420 X |
| 4,343,153 | 8/1982 | Kern et al. | 60/476 X |

*Primary Examiner*—Edward K. Look

*Attorney, Agent, or Firm*—Derek P. Freyberg; David A. Lowin; John A. Dhuey

[57] ABSTRACT

A hydraulic power source has a main body with a valve body and a valve assembly disposed in it. A reservoir and pump body assembly is connected to a top surface of the main body, and a hydraulic piston/cylinder assembly is connected to a bottom surface of the main body. A hydraulic circuit connects the various elements for fluid flow. The hydraulic power source is compact and can be located remotely on, for example a vehicle, at a point near an object or part to be moved.

13 Claims, 20 Drawing Figures

HYDRAULIC POWER SOURCE AND VALVE THEREFOR

BACKGROUND OF THE INVENTION

The present invention relates to devices for moving heavy objects. More particularly, the invention relates to a hydraulic power source; specifically, a miniaturized, modular, hydraulic pump, valve and reservoir with directly attachable hydraulic cylinder and motor.

In the past, hydraulic lifting systems have been quite space-consuming. They typically combined a reservoir for hydraulic fluid, a hydraulic valve, a pump, and a remote cylinder connected by conduits to the valve. Such devices are used, for example, to hoist heavy implements from a tractor, to tilt the cab on a truck, and to position the blade on earth-moving equipment. Hydraulic cylinders have also been used to lift patient-supporting devices, such as dental patient chairs and operating tables. They are also used in aircraft for the movement of the rudder, flaps, air brakes, etc.

A problem with the hydraulic power sources of the past was the size required to provide sufficient force. This usually caused the hydraulic pump and valve to be located remotely from the cylinder, which was connected to them by conduits such as hydraulic lines. Such hydraulic lines presented a problem in that they could become clogged or severed during operation. This is especially a problem in aircraft manufacture, where providing back-up hydraulic lines is space-consuming and weighty.

Another problem with hydraulic power sources of the past was that they required a large volume of hydraulic fluid for operation, usually requiring a large, separate reservoir for holding hydraulic fluid.

Various attempts have been made to reduce the size of hydraulic power systems and to improve the valve means that control them. For example, in U.S. Pat. No. 3,792,710 to McDermott, a motor-driven pump and valve assembly including a reversible pump and valve mechanism for controlling the flow of fluid between the pump and a fluid pressure-operated device is shown. A movable automatic valve element is shown for providing a fluid lock when the pump is inoperative. There, the reservoir, pump, motor and valve have been combined into a "single unit", but, in fact, the single unit was essentially the combination of a motor bolted to a pump housing bolted to a valve body, with a hydraulic reservoir attached to the top and hydraulic lines to connect the cylinder. In other words, the separate parts were just mounted onto a single chassis. Furthermore, the valve in the McDermott device allowed significant return flow from the hydraulic cylinder to the pump, using reduced diameter, parallel passageways to facilitate such return flow and to dampen it. Even as combined, the McDermott device appeared quite bulky and still required the cylinder to be located remotely from the power source.

Various double-acting, plunger-type valves have been shown in the prior art, such as the device to control a lifting cylinder illustrated in U.S. Pat. No. 3,975,987 to Panis, where a double-acting plunger helps control the rate of return flow in positive pressure situations; the valve was controlled by pressure from the pump. Panis also shows a control device housing which is integral with the lift cylinder. It does not, however, show the compactness and remote locatability provided by the present invention.

OBJECTS OF THE INVENTION

It is, therefore, an object of the present invention to provide a compact hydraulic power source.

Another object of the invention is to provide a modular hydraulic cylinder, valve, pump, motor and reservoir that combine to form a single assembly.

Yet another object of the invention is to provide a hydraulic power source that can be located entirely at the site of the object to be moved.

Still another object of the invention is to provide a modular hydraulic power assembly that can be easily removed and replaced.

SUMMARY OF THE INVENTION

The present invention contemplates a hydraulic power source having a main body with a valve body disposed therein, a double-acting, spool-type valve with central annular recesses disposed slidingly in the valve body, a pump body with a gear-type, interior-bearing rotary pump disposed therein; the pump being in communication with a unitary reservoir and the valve. A hydraulic cylinder is attachable to one side of the main body, one end of the cylinder being directly in communication with the valve through the main body and the other end of the cylinder communicating with the other end of the valve via a conduit. A pivitol attachment mounting is made unitary with the main body. A motor may be attached directly to one side of the main body for driving the pump gears. Check valves are provided between the reservoir and the valve.

In summary, the present invention provides a compact hydraulic power source which is assembled from a series of modular parts to form a single unit that can be located remotely at the object to be moved. Other objects and advantages of the invention will become apparent to those skilled in the art from the following detailed description of the invention, taking in conjunction with the figures.

DETAILED DESCRIPTION OF THE PREFERRED EMBODIMENTS

Figure 1:
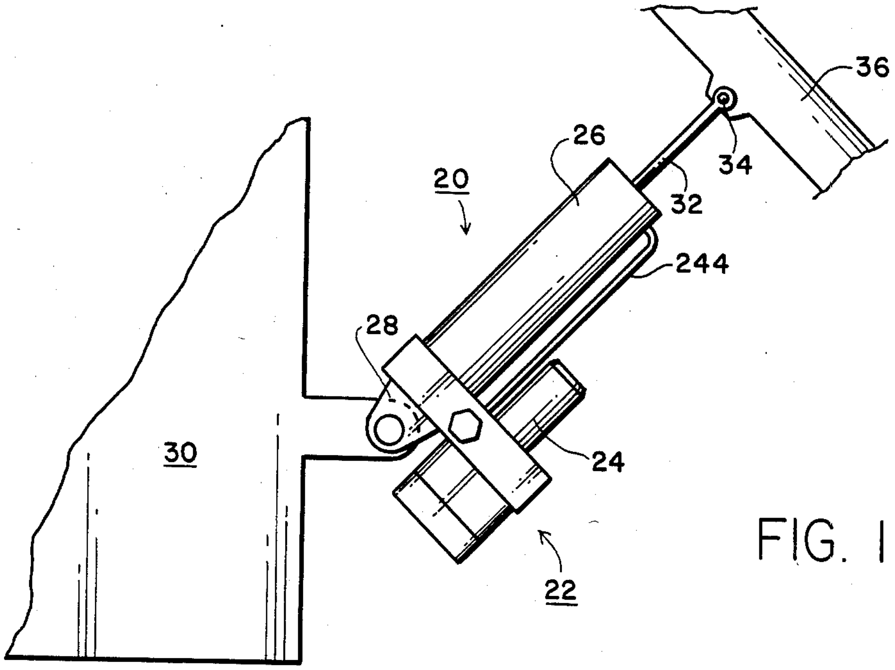
FIG. 1 is a side schematic view of a hydraulic power source embodying the principles of the present invention, shown connected between a support member and an object to be moved.

A hydraulic power source 20 has a pumping and control assembly 22, a power source 24 such as an electric motor, and a hydraulic piston and cylinder assembly 26, as illustrated in FIG. 1. The hydraulic power source is connected by a mount 28 to a supporting assembly 30, such as a dental patient chair, or to a vehicle such as an airplane, a truck, a tractor, or an automobile. An extendable rod 32 of the assembly 26 is pivotally connected by another mount 34 to an object 36 to be moved, such as a movable legrest or backrest of a dental patient chair, or a rudder or flap of an airplane, a plow or lifting platform on a truck, a hoist or other implement on a tractor, or a powered door on an automobile.

Figure 2:
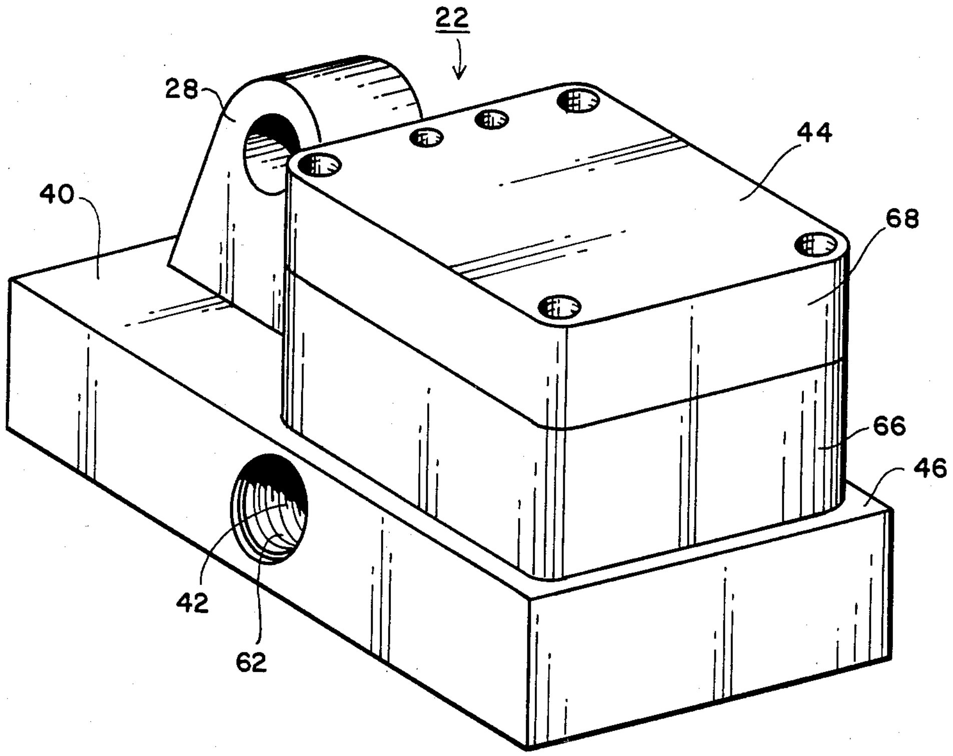
FIG. 2 is a perspective view of the hydraulic power source of the present invention, shown without a motor or a cylinder assembly.
Figure 3:
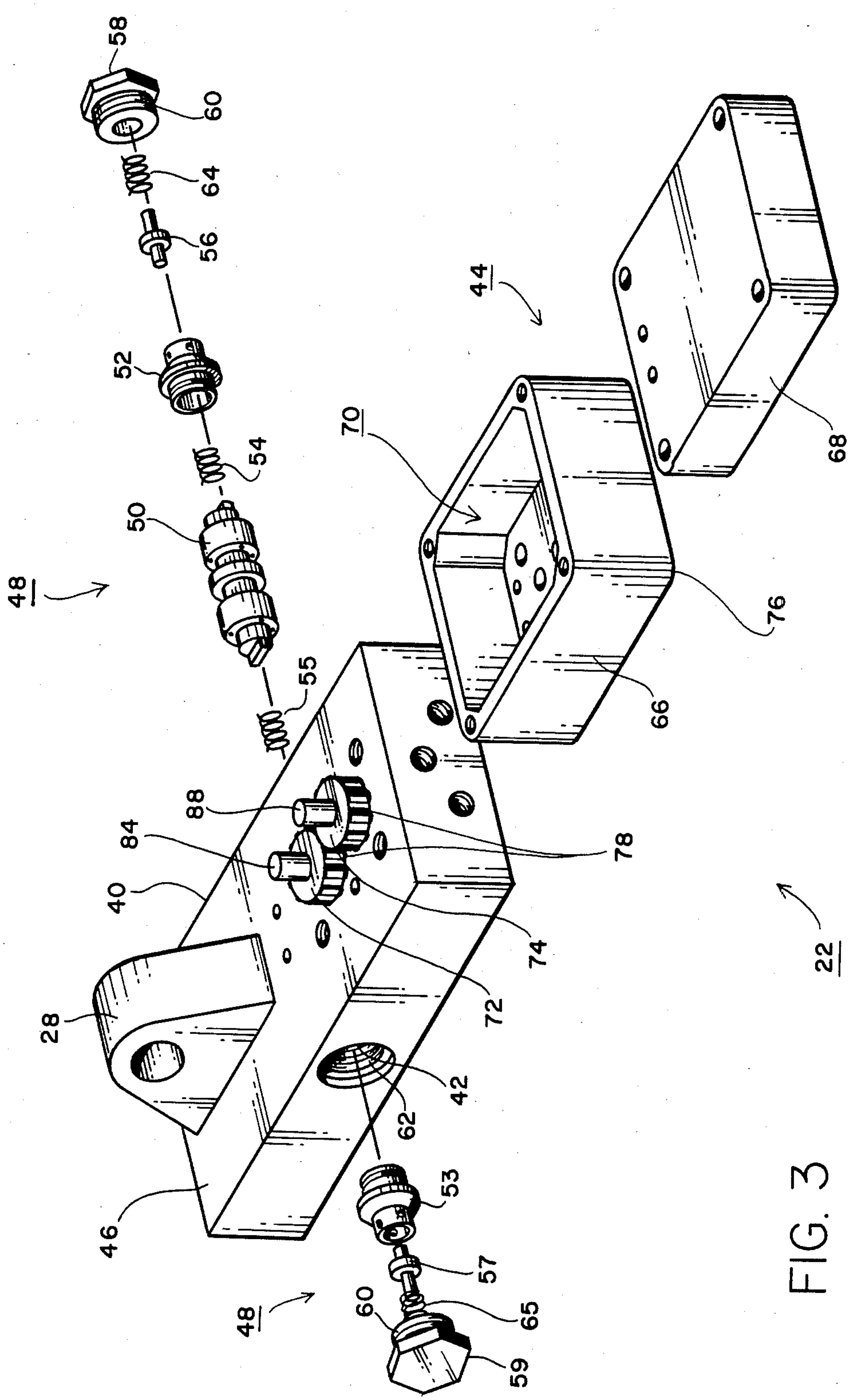
FIG. 3 is an exploded view of the hydraulic power source of FIG. 2, showing the valve removed from its housing and disassembled, and the pump and reservoir body assembly removed from the main body to expose the pump gears.

As illustrated in FIGS. 2 and 3, the pumping and control assembly 22 has a main body 40 with a valve body 42 disposed therethrough, and a reservoir and pump body assembly 44 mounted on its top surface 46. The mount 28 is unitary with the top surface 46 of the main body 40.

As illustrated in FIG. 3, a valve assembly 48 is disposed inside the valve body 42 and has a plunger 50, a pair of spring housings 52 and 53, one disposed on either side of plunger 50, a pair of springs 54 and 55 disposed between the plunger and adjacent spring housings 52 and 53 respectively, a pair of valve inserts 56 and 57 disposed on the other side of each of the spring housings, a pair of caps 58 and 59 having a threaded portion 60 receivable in a reciprocally threaded portion 62 of valve body 42, and a second pair of springs 64 and 65, one disposed between each valve insert 56 and 57 and the adjacent cap 58 and 59, respectively. (Even reference numerals indicate parts on the right side of the valve assembly 48 as shown in FIG. 3; odd reference numerals indicate parts on the left side.)

The reservoir and pump body assembly 44 has a pump body 66 and a reservoir cap 68. A reservoir 70 is formed by the inside of the pump body and the reservoir cap.

Figure 4:
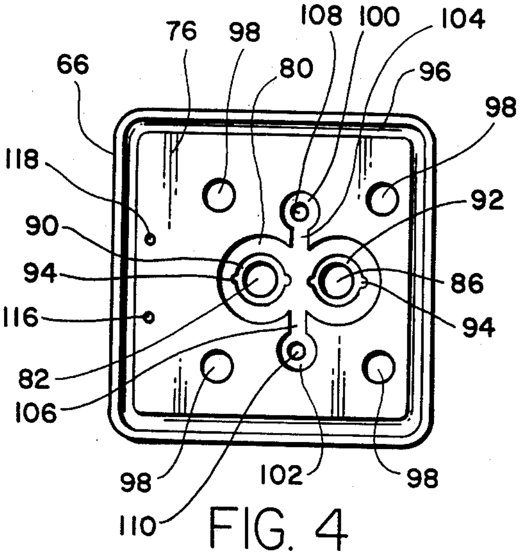
FIG. 4 is a bottom view of the pump housing of the present invention.
Figure 5:
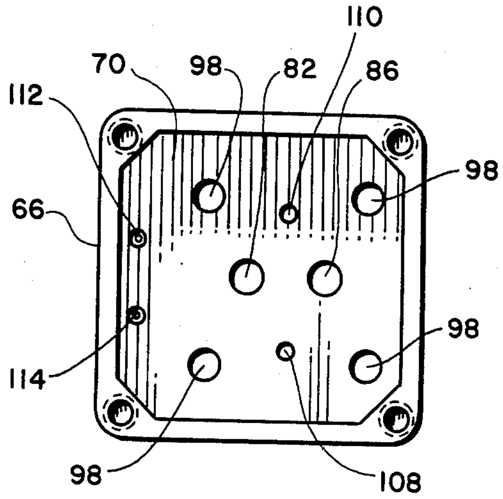
FIG. 5 is a top view of the pump housing of the present invention showing the bottom of the reservoir.

A first or drive gear 72 and a second gear 74 are received in the top surface 46 of main body 40 and in a bottom surface 76 of pump body 66. Provision is made for receiving a toothed portion 78 of gears 72 and 74 in a recess 80 projecting upwardly into the bottom surface 76 of pump body 66 as illustrated in FIG. 4. An opening 82 through the bottom of pump body 66 receives the top of a shaft 84 of the first gear 72. A second opening 86 receives the top of a shaft 88 of the second gear 74. A pair of lubrication channels 90 and 92 are recessed upwardly into the gear-receiving recess 80, respectively around openings 82 and 86, each including a pair of oppositely facing extensions 94 disposed along a common line. A circumfrential recess 96 is disposed into bottom surface 76 near its periphery for receiving a gasket or other seal (not shown). Four attachment openings 98 are disposed through the bottom of the pump body 66 for the passage of attachment means such as screws or bolts (not shown) for securing the pump body 66 to main body 40 First and second valve housings 100 and 102 are recessed upwardly into bottom surface 76 along a line perpendicular to the line of the extensions 94, midway between openings 82 and 86. A first passageway 104 connects first ball valve housing 100 with the gear-receiving recess 80. A second passageway 106 connects second ball valve housing 102 with the gear-receiving recess. Above the valves, which may be check valves (not shown), a pair of vertical channels 108 and 110 connect the first and second valve housings 100 and 102 respectively with reservoir 70 (see FIG. 5).

Figure 11:
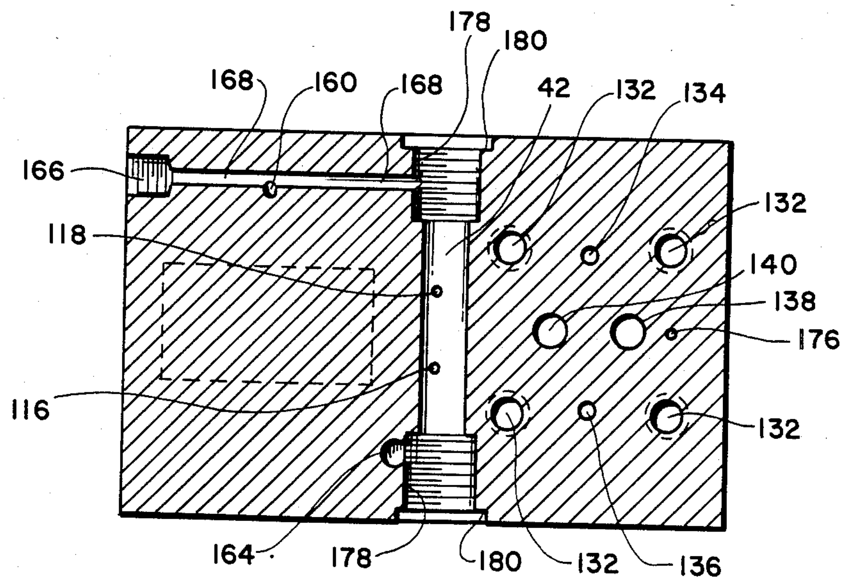
FIG. 11 is a sectional view of the body of FIG. 6, looking upward along line 11—11 in FIG. 8.
Figure 12:
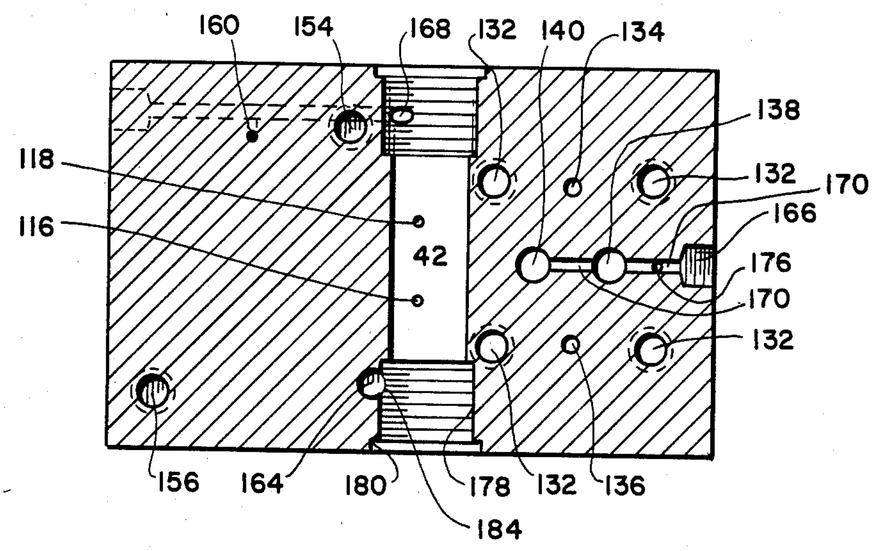
FIG. 12 is a sectional view of the body of FIG. 6, looking upward along line 12—12 in FIG. 9.

Disposed into the bottom of reservoir 70 are two valve housings 112 and 114 (FIG. 5) which are respectively connected with two vertical channels 116 and 118 (FIG. 4). Channels 116 and 118 pass through the bottom of pump body 66 and continue through the main body 40 to the top of valve body 42 (as illustrated in Figs. 6, 11 and 12).

Referring now to FIG. 6–10, the top surface 46, bottom surface 120, left end 122, right end 124, and front side 126 respectively of main body 40 are shown. The back side 128 of main body 40 is not shown in an elevational drawing because it is the reverse of front side 126.

Figure 6:
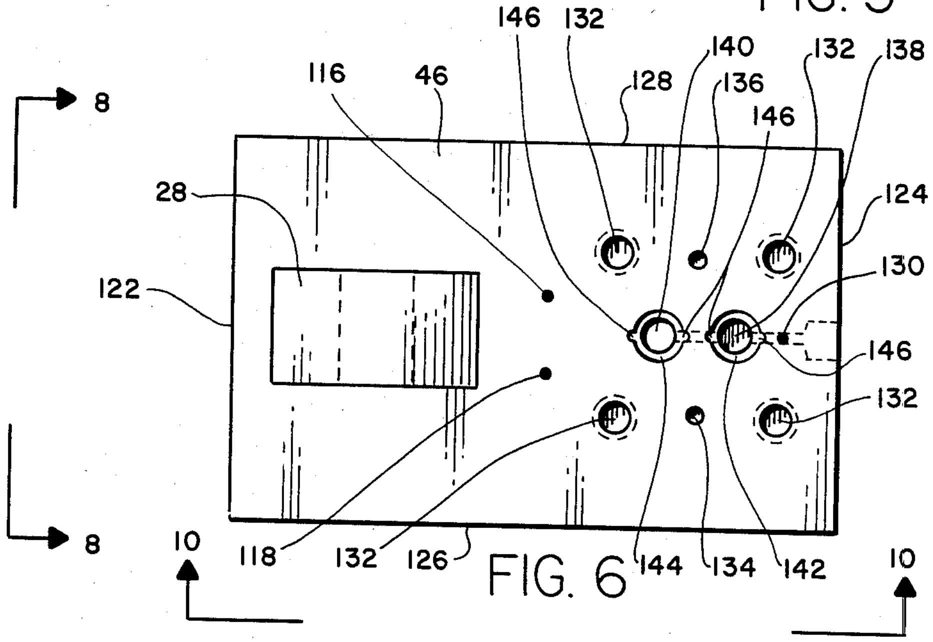
Fig. 6 is a top view of the main body of the hydraulic power source of the present invention.

As shown in FIG. 6, the top surface 46 of main body 40 is provided with a return lubrication flow opening 130. Four threaded openings 132 are disposed from the top surface 46 downwardly into the main body, corresponding to the openings 98 in pump body 66 for receiving the securing means (not shown). A pair of vertical channels 134 and 136 are disposed through top surface 46 downwardly into main body 40 and correspond respectively with ball valve housings 100 and 102. An opening and recess 138 is disposed downwardly into main body 40 for receiving the other end of the shaft 88 of gear 74. A channel 140 is provided through main body 40 for receiving the longer, drive shaft 84 of drive gear 72. Surrounding the opening 138 and channel 140 are lubrication channel recesses 142 and 144 respectively, each having a pair of aligned extensions 146. Recesses 142 and 144 and the extensions 146 correspond to the recesses and extensions 90, 92 and 94 in the bottom surface 76 of pump body 66.

Figure 7:
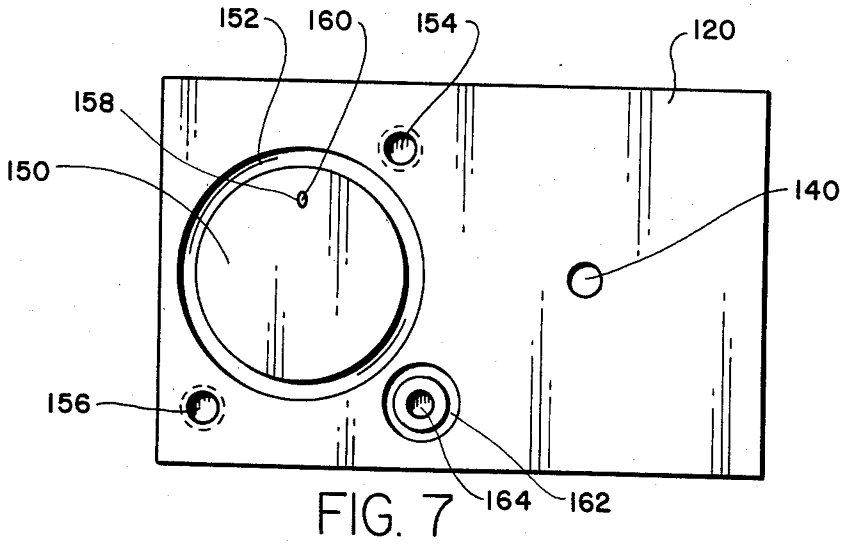
FIG. 7 is a bottom view of the body of FIG. 6.

Referring to FIG. 7, a cylinder head attachment area 150 is shown on bottom surface 120, including a circular recess 152 for receiving a flange on the cylinder head (not shown), two threaded recesses 154 and 156 for receiving mounting means, such as threaded bolts, for securing the cylinder to main body 40, and an opening 158 leading to an angular passageway 160 that extends upwardly into the main body. Also shown as recessed into bottom surface 120 is a threaded recess 162 for connecting an outside hydraulic fluid conduit (not shown) to a vertical passageway 164 leading to the valve body 42.

Figure 8:
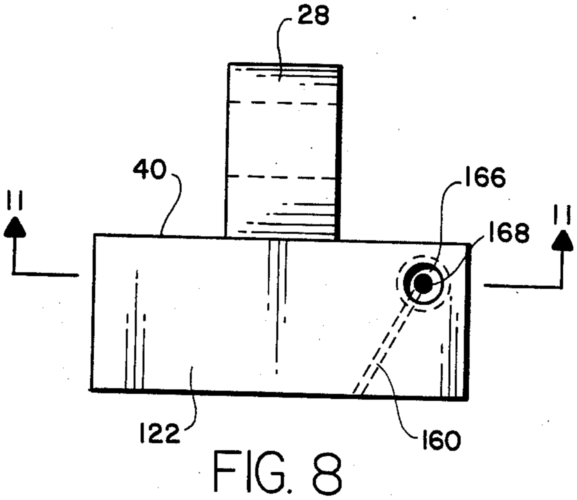
FIG. 8 is an end view of the body of FIG. 6, taken along line 8—8 in FIG. 6.

Referring to FIG. 8, a threaded recess 166 is shown leading to a horizontal passageway 168 which connects the angular passageway 160 to valve body 42. A capped member (not shown) fits in recess 166, which is used for drilling the horizontal passageway 168.

Figure 9:
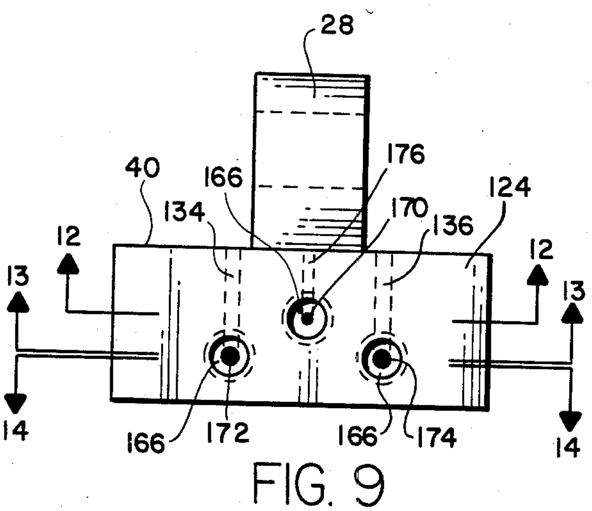
FIG. 9 is an end view of the body of FIG. 6, taken along line 9—9 in FIG. 6.

Referring to FIG. 9, three threaded recesses 166 are shown leading to horizontal passageways 170, 172 and 174. These threaded recesses 166 are covered with capped members (not shown) to cover the opening used for drilling horizontal passageways 170, 172 and 174. Horizontal passageway 170 intersects a vertical passageway 176 (see FIG. 12) which leads to return lubrication flow opening 130. Horizontal passageway 170 connects vertical passageway 176 with recess 138 and the channel 140 which house the bottom shafts 88 and 84 of gears 74 and 72 respectively, completing a return lubrication flow circuit through main body 40. Horizontal passageway 172 intersects vertical passageway 134, connecting it with valve body 42. Horizontal passageway 174 intersects with vertical passageway 136, connecting it with the valve body 42.

Figure 10:
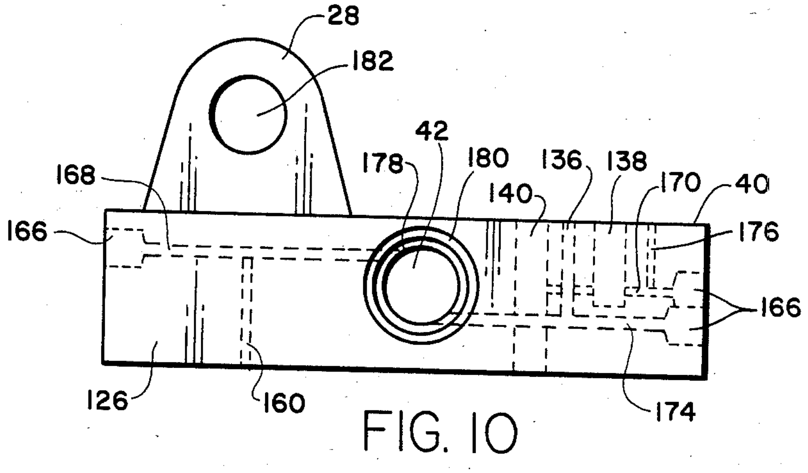
FIG. 10 is a front view of the body of FIG. 6, taken along line 10—10 in FIG. 6.

FIG. 10 illustrates the front side 126 of main body 40. Valve body 42 is disposed through the center of main body 40. On either side of the valve body is a threaded portion 178 and a recessed portion 180 for receiving the capped members 58. Also shown in FIG. 10 is mounting means 28, which can be seen as an extension unitary with main body 40, having an opening 182 disposed toward its top center. The mounting means 28 is somewhat wedge-shaped with a rounded top to offer the least amount of interference with the corresponding mounting means to which it is subsequently attached.

FIG. 11 is a horizontal section through main body 40 looking upwardly toward top surface 46. It illustrates the threaded recess 166 in end 122, and the connection of horizontal passageway 168 between angular passageway 160 and an interior end of the threaded portion 178 of valve body 42, also illustrating the continuation of the openings and passageways described with reference to FIGS. 6 and 7.

FIG. 12 is likewise a horizontal section through the valve body looking upwardly toward top surface 46, illustrating horizontal passageway 170 as it connects the openings 138 and 140 with vertical passageway 176 to form the lubrication circuit. Also illustrated is the angular displacement of passageway 160.

Figure 13:
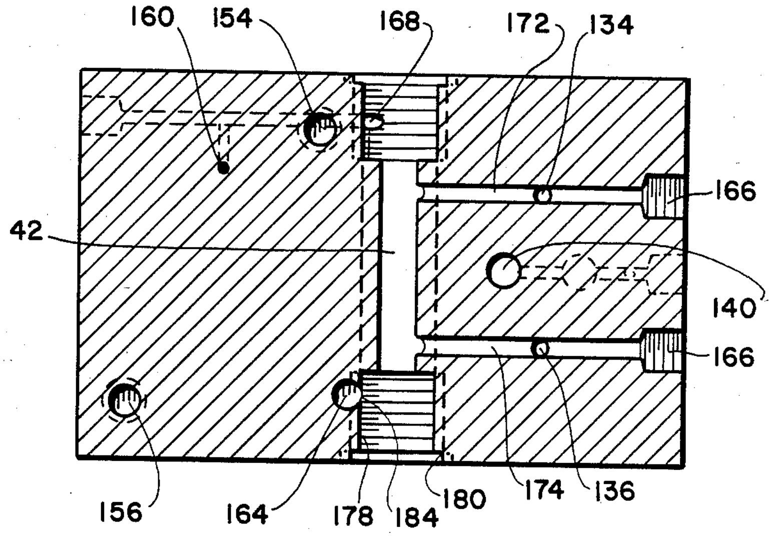
FIG. 13 is a sectional view of the body of FIG. 6, looking upward along line 13—13 in FIG. 9.
Figure 14:
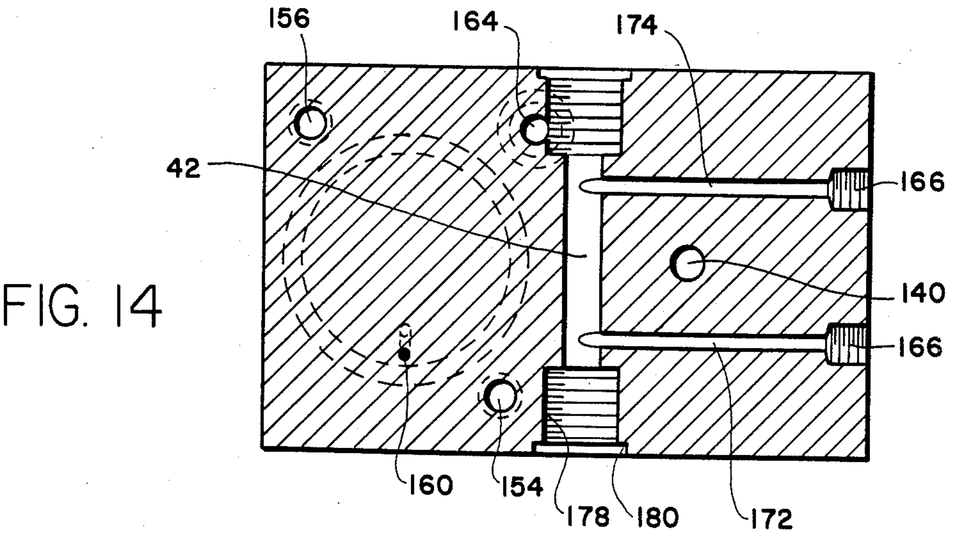
Fig. 14 is a sectional view of the body of FIG. 6, looking downward along line 14—14 in FIG. 9.

FIGS. 13 and 14 are, respectively, upwardly-looking and downwardly-looking horizontal cross-sections through main body 40, illustrating the hydraulic circuitry connecting the pump and reservoir first to valve 48, and then to cylinder 26. As shown, horizontal passageways 172 and 174 intersect vertical passageways 134 and 136 leading to the check valve housings 100 and 102, respectively. As illustrated best in the diagramatic hydraulic circuit sketch (i.e., FIG. 20), horizontal passageways 172 and 174 intersect valve body 42 at points such that only one of them can be unobstructed by the plunger at any given time, and that both are obstructed by the plunger when the system is at rest. FIG. 13 best illustrates the connection of passageways 164 and 168 to valve body 42. Passageway 164 is drilled vertically from the bottom surface 120 of the main body, upwardly into main body 40 so that a side 184 of the passageway is abbreviated at the intersection with threaded portion 178 of valve body 42. This allows communication between the piston end of a hydraulic piston and cylinder assembly with one end of the valve assembly 48. Similarly, horizontal passageway 168 intersects the other threaded portion 178 near its top to allow communication between the head end of a hydraulic piston assembly, through angular passageway 160, with the other end of valve assembly 48.

Figure 15:
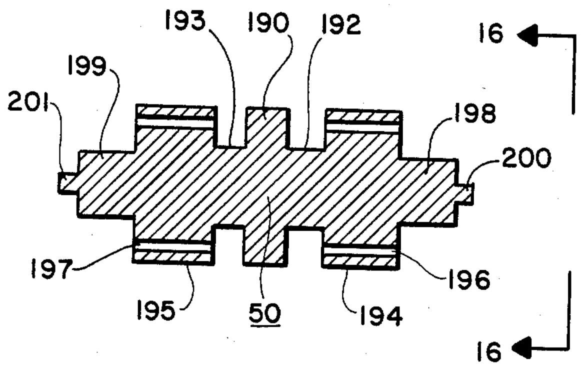
FIG. 15 is a cross-sectional view of the double-acting plunger embodying the principles of the present invention.
Figure 16:
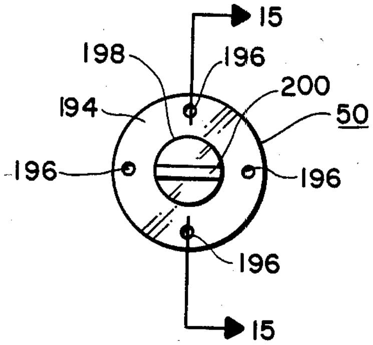
FIG. 16 is an end view of the plunger, taken along line 16—16 in FIG. 15.

Referring now to FIGS. 15–19, plunger 50, spring housing 53, and valve insert 57 will be described. As shown in FIGS. 15 and 16, dual-acting plunger 50 has a solid central portion 190. Disposed outwardly on either side of the solid central portion are a pair of first recessed portions 192 and 193, a pair of perforated, full-sized portions 194 and 195 each having a plurality horizontal passageways 196 and 197 disposed therethrough, a pair of reduced diameter projections 198 and 199, and a pair of valve insert contacting projections 200 and 201. The reduced diameter recessed portions 192 facilitate communication between the horizontal passageways 172 and 174, which contact valve body 42 outside the perforated, full-sized portions 194 and 195, through the horizontal passageways 196 and 197 to the vertical passageways 116 and 118. (The positioning of and flow through plunger 50 will be illustrated for both extension and retraction of the hydraulic piston and cylinder assembly with reference to the hydraulic circuit sketch of FIG. 20.)

Figure 18:
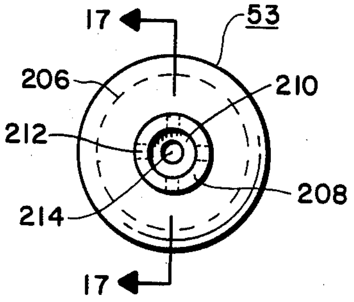
FIG. 18 is an end view of the spring housing of FIG. 17, taken along line 18—18 in FIG. 17.
Figure 17:
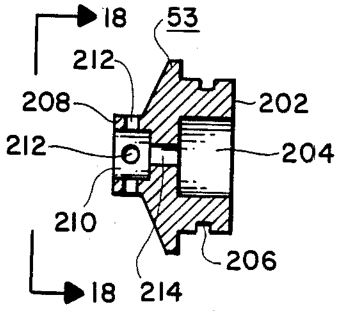
FIG. 17 is a cross-sectional view of a spring housing embodying the principles of the present invention.

Spring housing 53, as illustrated in FIGS. 17 and 18, receives the reduced diameter projection 199 and valve insert contacting projection 201 from plunger 50 at a first side 202 in a cavity 204. An annular groove 206 is provided in the outside of spring housing 52 toward its first end 202 for receiving an O-ring or similar sealing means (not shown). A second side 208 has a cavity 210 for receiving valve insert 57. The spring housing body has four relatively large openings 212 for communication between cavity 210 and the threaded portion 178 of valve body 42. A centrally disposed horizontal passageway 214 connects cavities 204 and 210.

Figure 19:
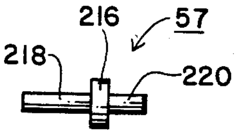
FIG. 19 is a cross-sectional view of a valve insert embodying the principles of the present invention.

Valve insert 57, as illustrated in FIG. 19, has a solid central portion 216, a long extension 218 extending axially on one side, and a somewhat shorter extension 220 extending axially from the other side. Solid portion 216 is received in cavity 210 and the short extension 220 extends through passageway 214 to the other cavity 204 for contact by projection 201 of plunger 50. Short extension 220 is of such a diameter that it permits flow between the two cavities 204 and 210 when solid portion 216 is urged away from opening 214. The longer extension 218 contacts a spring 65 which urges the solid portion 216 towards opening 214.

OPERATION OF THE HYDRAULIC POWER SOURCE

Figure 20:
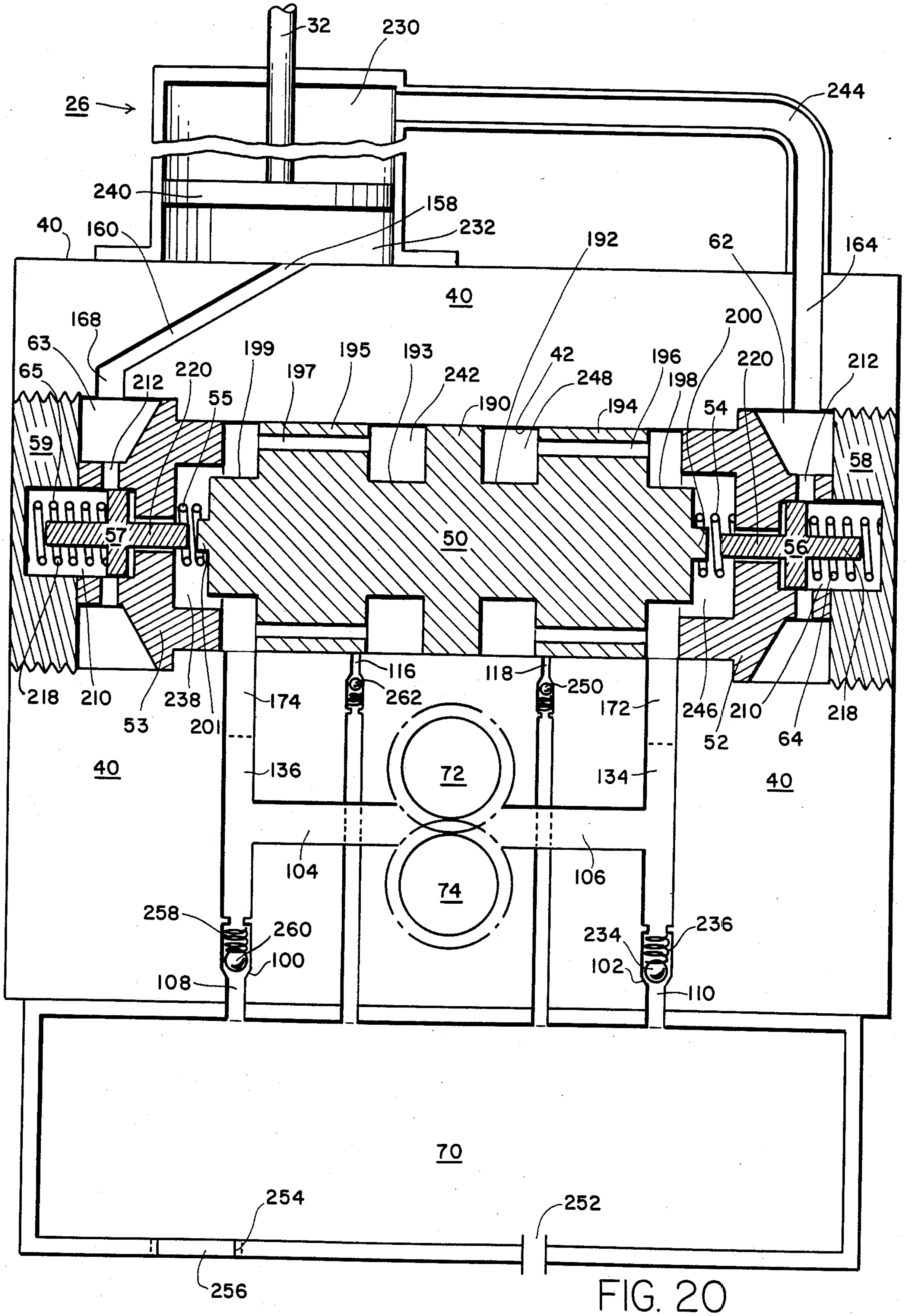
FIG. 20 is a schematic diagram illustrating the hydraulic circuit and valve of the present invention.

Operation of the hydraulic power source 20 will be described with reference to the schematic hydraulic flow diagram of FIG. 20. In operation, the motor is activated to turn first gear 72 via its bottom shaft, which in turn drives second gear 74. The direction of rotation of the gears will determine whether the hydraulic piston and cylinder assembly 26 is pumped upwardly towards its rod end 230 or downwardly towards head end 232. Assuming that rod 32 is to be extended, first gear 72 would rotate in a counter clockwise direction. This creates a negative pressure on a first check valve 234 which is situated in valve housing 102 and is provided with a relatively light-tensioned spring 236. It also causes a positive pressure to build on a second check valve 260, urging it towards its valve housing 100. The negative pressure causes valve 234 to open and allow a flow of hydraulic fluid from reservoir 70 into vertical channel 110, to passageway 106, around the gears 72 and 74 to passageway 104, down vertical channel 136 to horizontal channel 174 and into the left portion 238 of the valve housing as defined by the space between the left perforated, full-size portion 195 of plunger 50 and the left spring housing 53. Initially, the two valve inserts 56 and 57 are seated in cavity 210 and the plunger 50 is in its central position. As pressure builds inside the left side of valve body 42, the left valve insert 57 is urged toward the left, causing it to unseat and to permit a flow of fluid through central passageway 214 and out openings 212 into the left, threaded portion 63 of valve body 42. The fluid continues through horizontal passageway 168 to angular passageway 160, and out opening 158 into the head end 232 of the hydraulic piston cylinder 26, where it exerts pressure on a piston 240 located within the cylinder. As the pump continues to operate, pressure builds up in head end 232 until enough has accumulated to lift the object to be moved. Pressure continues to build in space 238 and to urge against plunger 50; the pressure is applied against solid central portion 190 in a space 242 defined by first recessed portion 193, which is in communication with space 238 via the horizontal passageways 197. Up to this point, significant movement of rod 32 is precluded by valve insert 56 being held in the closed position by spring 64 on the right side of valve body 42. When sufficient pressure develops on the left side of the valve body to overcome the resistance of right side springs 54 and 64, the plunger moves to the right and valve insert contacting projection 200 contacts short extension 220, urging valve insert 56 away from its seat and allowing flow from rod end 230 through a conduit 244 into vertical passageway 164, into the right, threaded portion 62 of valve body 42, where it passes through openings 212 in right spring housing 52, past valve insert 56, through the centrally disposed horizontal passageway 214, and into a space 246 defined by the reduced diameter projection 198 of plunger 50. When plunger 50 is urged to the right, the right, perforated full-size portion 194 blocks fluid from entering horizontal passageway 172 by covering the point where it opens into valve body 42. The hydraulic fluid, therefore, passes through horizontal passageways 196 and into another space 248, defined by recessed portion 192 of plunger 50, from where it passes into right vertical channel 118 and unseats an adjustable valve 250, whereupon it passes through to reservoir 70, completing the circuit.

Reservoir 70 must be sufficiently large to contain a volume of hydraulic fluid equal to the difference in volume between rod end 230 and head end 232, respectively, when completely filled. A two-way valve 252 is provided in the reservoir for relieving changes in pressure caused by making up that difference in volume. The reservoir is also provided with a fill opening 254 which is closeable by a plug 256. The valve 252 and the opening 254 are preferrably disposed in a side of the reservoir cap which faces upwardly when the power source is installed for operation.

When pumping the cylinder toward head end 232, drive gear 72 is rotated clockwise causing a negative pressure to develop, sufficient to overcome the force of a light spring 258 urging second check valve 260 closed. The first check valve 234 is urged towards its closed position by positive pressure at the other side of the pump. This allows a flow of hydraulic fluid from reservoir 70 into vertical channel 108, to passageway 104, past gears 72 and 74, into the other passageway 106 and down vertical channel 134 into horizontal passageway 172 leading to space 246. There, pressure builds up on the right side of the valve body 42 causing valve insert 56 to be displaced to the right, opening a flow path through central opening 214 and out the openings 212 into the right, threaded portion 62, and out through vertical passageway 164 to conduit 244 and into the rod end 230 of hydraulic piston cylinder assembly 226. Movement of the piston 240 downwardly is blocked by closed valve insert 57, until sufficient pressure builds to urge the plunger to the left causing projection 201 to contact extension 220 and move valve insert 57 off its seat. This allows a flow of hydraulic fluid from head end 232 through opening 158 and angular passageway 160 to horizontal passageway 168, and into the left, threaded portion 63 of valve body 42, where it passes through opening 212 in left spring housing 53, through central passageway 214, and into the space 238. Access to the horizontal passageway 174 is blocked by the left full-size portion 195 of plunger 50, so fluid flows through horizontal passageways 197 into space 242 where it enters vertical passageway 116 to unseat a second adjustable valve 262, wherefrom it returns to reservoir 70.

The preferred materials for the hydraulic power source are metals, preferably aluminum and alloys. The preferred material for the valve inserts is nylon. The motor may be a 12-volt DC motor available from any original equipment manufacturer, as may be the hydraulic piston cylinder assembly. Piston cylinder assembly 26 must be chosen to fit the size of circular recess 152.

While the foregoing description has been made with reference to a gear-type, interior-bearing rotary pump, other types of reversible pumps, such as vane pumps and piston pumps, will function in the hydraulic power source and are intended to be covered as part of the present invention.

Use of the terms "vertical" and "horizontal" refers to the orientation of elements as initially shown in FIG. 2. The horizontal or vertical orientation of these elements when in use will depend upon how the hydraulic power source is installed and whether the piston/cylinder assembly is extended.

As shown, the hydraulic power source of the present invention is a compact assembly which can be located remotely at a point near an object to be moved, eliminating the need for long hydaulic lines and the danger that a hydraulic line may be severed. It has the advantage of providing adequate power at remote locations while remaining compact in size and easily replaceable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A hydraulic power source adaptable for attachment to a motor, a reservoir of hydraulic fluid, and a double-acting piston/cylinder assembly, capable of providing hydraulic power to a selected side of the piston/-cylinder assembly solely by selecting the direction of operation of the motor, comprising:

(a) a valve body, having a cylindrical bore therethrough;

(b) a valve assembly, disposed in the cylindrical bore, comprising, in axial alignment:

(i) a double-acting cylindrical plunger, movable axially in the cylindrical bore between a central position and a valve-opening position on either side of the central position, the plunger having a solid central portion, a pair of annularly recessed portions, one on either side of the central portion, a pair of non-recessed portions, one disposed axially outwardly of each recessed portion, and a pair of reduced diameter valve-opening portions, one extending axially outwardly from each non-recessed portion, each of the non-recessed portions having a plunger conduit therethrough connecting a space about the adjacent annularly recessed portion with a headspace about the adjacent valve-opening portion, (ii) a pair of springs, one associated with and disposed about each valve-opening portion to urge the plunger to its central portion in the bore, (iii) a pair of spring housings, one associated with and disposed axially outwardly of each spring to retain it and each having a housing conduit axially therethrough, and (iv) a pair of check valves, one associated with each housing conduit, and each being biased closed to prevent flow axially inwardly through the housing conduit, each being openable by the corresponding valve-opening portion of the plunger when the plunger is in its valve-opening position with respect to that check valve;

(c) a pair of cylinder conduits, one associated with and connected at one end thereof to each housing conduit on that side of the check valve associated therewith remote from the headspace, and adapted to be connected at the other end thereof to one side of the piston/cylinder assembly;

(d) a pair of supply conduits, one associated with and connected at a first end thereof to each headspace through the cylindrical bore such that the conduit is open to the headspace when the plunger is in other than the valve-opening position with respect to the check valve associated with that headspace, and adapted to be connected at a second end thereof to the reservoir, each supply conduit having therein a supply check valve, the supply check valve being normally biased closed to prevent flow through the supply conduit to the reservoir;

(e) a pair of return conduits, one associated with and connected at a first end thereof to the space surrounding each annularly recessed portion through the cylindrical bore such that the conduit is open to the space only when the plunger is in the valve-opening position with respect to the check valve nearer the return conduit, and adapted to be connected at a second end thereof to the reservoir, each return conduit having therein a return check valve, the return check valve being normally biased closed to prevent flowthrough the return conduit away from the reservoir;

(f) a cross-flow conduit joining the pair of supply conduits at a point in each which is between the supply check valve and the first end; and (g) a reversible pump intersecting the cross-flow conduit and adapted for connection to the motor, the pump being capable of pumping hydraulic fluid in either direction through the cross-flow conduit in response to the direction of operation of the motor;

whereby operation of the motor in a selected direction causes axial displacement of the plunger in the bore from its central position toward a valve-opening position, thereby causing the valve assembly to permit hydraulic fluid flow only in a desired direction and thus operate the piston/cylinder assembly in a direction corresponding to the selected direction.

2. The hydraulic power source of claim 1, further comprising receiving means integral with the valve body for attachment of the motor, reservoir, and piston/cylinder assembly.

3. The hydraulic power source of claim 2, wherein the receiving means for attachment of the piston/cylinder assembly are recessed into the valve body and one of the cylinder conduits is entirely located within the valve body.

4. The hydraulic power source of claim 1, further comprising the reservoir, the reservoir being integral with the valve body so that the supply conduit, return conduits, and cross-flow conduit are located entirely within the valve body.

5. The hydraulic power source of claim 4, further comprising receiving means integral with the valve body for attachment of the motor and piston/cylinder assembly.

6. The hydraulic power source of claim 5, wherein the receiving means for attachment of the piston/cylinder assembly are recesed into the valve body and one of the cylinder conduits is entirelly located within the valve body.

7. The hydraulic power source of claim 4, wherein the pump is located within the valve body.

8. The hydraulic power source of claim 4, further comprising the motor.

9. The hydraulic power source of claim 8, wherein the motor is an electric motor.

10. The hydraulic power source of claim 9, wherein the motor is a reversible, direct current electric motor.

11. The hydraulic power source of claim 8, further comprising receiving means integral with the valve body for attachment of the piston/cylinder assembly.

12. The hydraulic power source of claim 11, wherein the receiving means for attachment of the piston/cylinder assembly are recessed into the valve body and one of the cylinder conduits is entirely located within the valve body.

13. The hydraulic power source of claim 12, wherein the pump is located within the valve body.

* * * * *